US012689741B2

(12) United States Patent
Wang et al.

(10) Patent No.: US 12,689,741 B2
(45) Date of Patent: Jul. 21, 2026

(54) METHODS AND APPARATUS TO DETECT A REGION OF INTEREST BASED ON VARIABLE RATE SHADING

(71) Applicant: Intel Corporation, Santa Clara, CA (US)

(72) Inventors: Chengwei Wang, Shanghai (CN); Zhizhen Tang, Shanghai (CN); Tiance Wu, Shanghai (CN); Anxiao Lu, Shanghai (CN); Yanjie Gu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/865,951

(22) PCT Filed: Jun. 14, 2022

(86) PCT No.: PCT/CN2022/098748
§ 371 (c)(1),
(2) Date: Nov. 14, 2024

(87) PCT Pub. No.: WO2023/240466
PCT Pub. Date: Dec. 21, 2023

(65) Prior Publication Data
US 2025/0310544 A1      Oct. 2, 2025

(51) Int. Cl.
*H04N 19/167* (2014.01)
*G06V 10/25* (2022.01)
*G06V 20/40* (2022.01)

(52) U.S. Cl.
CPC ........... *H04N 19/167* (2014.11); *G06V 10/25* (2022.01); *G06V 20/40* (2022.01)

(58) Field of Classification Search
CPC ........... G06T 9/00; G06T 9/001; G06T 9/005; G06T 3/4092; G06T 7/11; G06T 9/007
See application file for complete search history.

(56) References Cited

U.S. PATENT DOCUMENTS

2003/0095599 A1*   5/2003   Lee ...................... H04N 19/162
                                                                375/E7.076
2003/0202581 A1   10/2003   Kodama
(Continued)

FOREIGN PATENT DOCUMENTS

CN        102665077  A       9/2012
CN        103974071  A       8/2014
(Continued)

OTHER PUBLICATIONS

Mueller JH, Voglreiter P, Dokter M, Neff T, Makar M, Steinberger M, Schmalstieg D. Shading atlas streaming. ACM Transactions on Graphics (TOG). Dec. 4, 2018;37(6):1-6. (Year: 2018).*
(Continued)

*Primary Examiner* — Clifford Hilaire
(74) *Attorney, Agent, or Firm* — Hanley, Flight & Zimmerman, LLC

(57) ABSTRACT

Methods, apparatus, systems, and articles of manufacture to identify regions of interest of an image based on a variable rate shading (VRS) mask created from a video image. A method to detect the regions can include detecting, with one or more processors, regions of interest of the video image based on the VRS mask, the VRS mask generated by a renderer. The method can also include encoding, with one or more processors, the regions of interest of the video image, the encoding to include adjusting a quantization parameter suitable to encoding the regions of interest.

13 Claims, 12 Drawing Sheets

(56) References Cited

U.S. PATENT DOCUMENTS

| | | | |
|---|---|---|---|
| 2007/0127794 A1* | 6/2007 | Niogi | G06V 10/25 |
| | | | 382/128 |
| 2020/0389672 A1* | 12/2020 | Kennett | G06T 3/4053 |
| 2021/0067757 A1* | 3/2021 | Yun | H04N 13/282 |

FOREIGN PATENT DOCUMENTS

| | | |
|---|---|---|
| CN | 113940066 A | 1/2022 |
| JP | 2001119696 A | 4/2001 |

OTHER PUBLICATIONS

International Searching Authority, "International Search Report," issued in connection with International Application No. PCT/CN2022/098748, mailed on Dec. 19, 2022, 3 pages.

International Searching Authority, "Written Opinion of the International Searching Authority," issued in connection with International Application. No. PCT/CN2022/098748, mailed on Dec. 19, 2022, 4 pages.

International Searching Authority, "International Preliminary Report on Patentability," issued in connection with International Application No. PCT/CN2022/098748, issued on Dec. 10, 2024, 5 pages.

Suzuki et al., "Linear-Time Connected-Component Labeling Based on Sequential Local Operations," Computer Vision and Image Understanding, vol. 89, No. 1, Jan. 2003, retrieved from <https://doi.org/10.1016/S1077-3142(02)00030-9> on Mar. 16, 2026, 23 pages.

Dalal et al., "Histograms of Oriented Gradients for Human Detection," IEEE Computer Society Conference on Computer Vision and Pattern Recognition, Jun. 20-25, 2005, retrieved from <https://doi.org/10.1109/CVPR.2005.177> on Mar. 16, 2026, 8 pages.

Felzenszwalb et al., "A Discriminatively Trained, Multiscale, Deformable Part Model," IEEE Conference on Computer Vision and Pattern Recognition, Jun. 23-28, 2008, retrieved from <http://doi.org/10.1109/CVPR.2008.4587597> on Mar. 16, 2026, 8 pages.

Vaidyanathan et al., "Coarse Pixel Shading," Proceedings of High Performance Graphics, 2014, retrieved from <https://www.researchgate.net/publication/288811329_Coarse_pixel_shading> on Mar. 16, 2026, 10 pages.

Girshick, "Fast R-CNN," IEEE International Conference on Computer Vision, Dec. 7-13, 2015, retrieved from <doi.org/10.1109/ICCV.2015.169> on Mar. 16, 2026, 9 pages.

Redmon et al., "You Only Look Once: Unified, Real-Time Object Detection," IEEE Conference on Computer Vision and Pattern Recognition, Jun. 27-30, 2016, retrieved from <doi.org/10.1109/CVPR.2016.91> on Mar. 16, 2026, 10 pages.

Liu et al., "SSD: Single Shot MultiBox Detector," Dec. 29, 2016, arXiv:1512.02325 [cs.CV], retrieved from <https://arxiv.org/abs/1512.02325> on Mar. 16, 2026, 17 pages.

Lake et al., "Get Started with Variable Rate Shading on Intel® Processor Graphics," Intel, Dec. 2, 2019, retrieved from <https://www.intel.com/content/www/us/en/developer/articles/guide/getting-started-with-variable-rate-shading-on-intel-processor-graphics.html> on Mar. 16, 2026, 11 pages.

Van Rhyn, "Moving Gears to Tier 2 Variable Rate Shading," Microsoft, Jan. 12, 2021, retrieved from <https://devblogs.microsoft.com/directx/gears-vrs-tier2/> on Mar. 16, 2026, 20 pages.

* cited by examiner

600

608

604

602

VRS INTENSITY LEGEND

1x1

1x2

2x1

2x2

606

800

804

802

806

METHODS AND APPARATUS TO DETECT A REGION OF INTEREST BASED ON VARIABLE RATE SHADING

RELATED APPLICATION(S)

This application corresponds to the U.S. national phase of International Patent Application No. PCT/CN2022/098748, which was filed on Jun. 14, 2022. Priority to International Patent Application No. PCT/CN2022/098748 is claimed. International Patent Application No. PCT/CN2022/098748 is incorporated herein by reference in its entirety.

BACKGROUND

Regions of interest (ROI) encoding is a widely used feature to enhance encoding quality in the arena of computer generated graphics. Current techniques to detect a region of interest generally include: i) traditional detectors (e.g., a HOG Detector, a Deformable Part-based Model (DPM), etc.) and ii) Convolutional Neural Network (CNN) detectors. ROI encoding is designed to improve image quality on objects (or areas) of interest in a graphics scene (e.g., a video scene) while reducing the quality level in less interesting areas of the same video scene. Both such techniques are typically applied to every frame in a video sequence.

BRIEF DESCRIPTION OF THE DRAWINGS

In general, the same reference numbers will be used throughout the drawing(s) and accompanying written description to refer to the same or like parts. The figures are not to scale.

Figure 1:
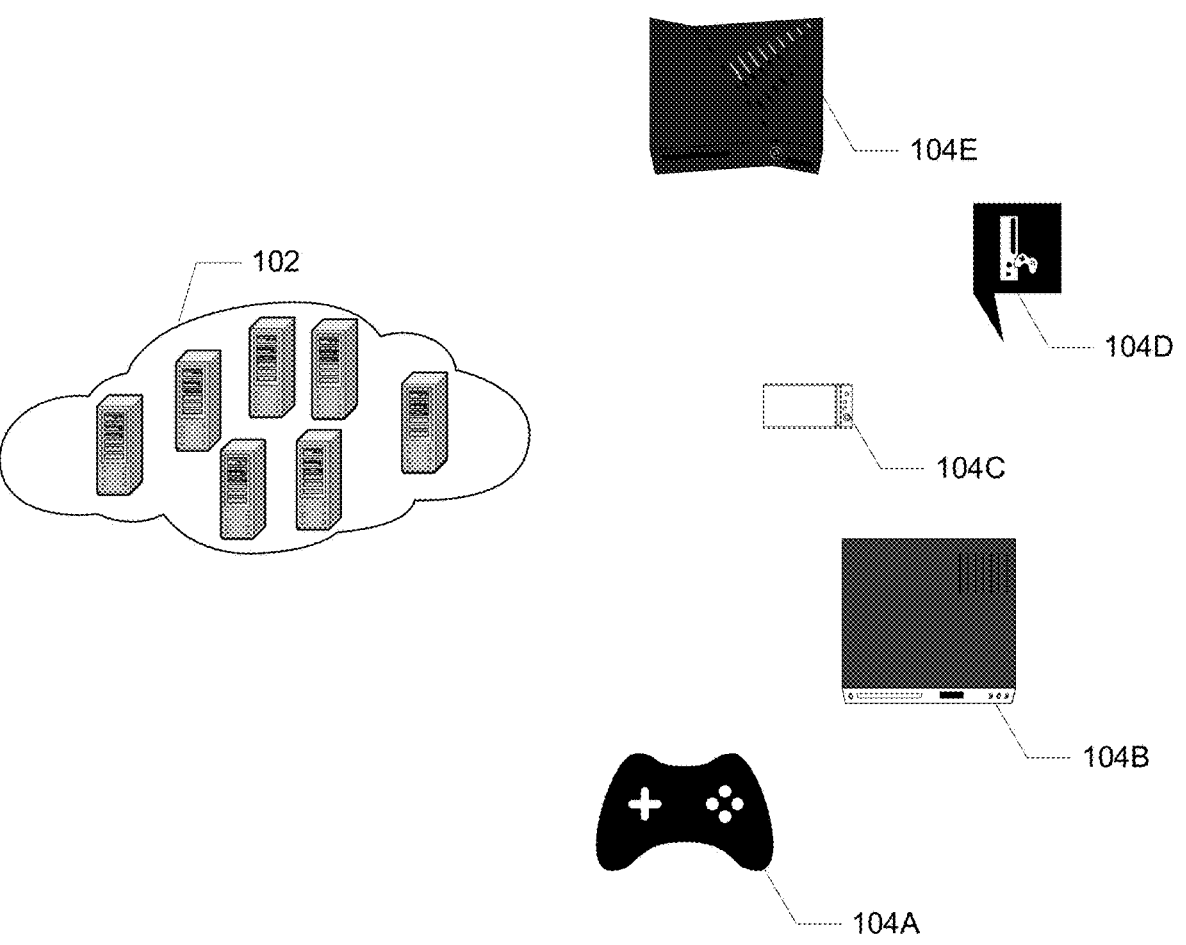
FIG. 1 is a block diagram of a cloud-based gaming system that streams games to client gaming devices.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Cloud gaming is a type of online gaming that runs video games on remote servers and streams the games directly to a user's device (also referred to as a client device and/or a gaming device). In a cloud gaming scenario, due to bandwidth limitations, rendered video frames must be encoded before being sent to a client device. As such, the encoding quality is of great significance when it comes to user experience. Although, as stated above, region of interest (ROI) encoding is a widely used technique to improve encoding quality, ROI detectors based on either of traditional or convolutional neural networks (CNNs) techniques require a large amount of computation resources as they are applied to every frame in a video sequence. In addition, traditional and CNN techniques used to perform ROI detection are sensitive to a dataset on which they are trained. A new ROI detection method disclosed herein is based on using variable rate shading (VRS) masks generated by graphics for cloud gaming. This novel VRS mask-based ROI detection technique requires almost negligible computation and is not data sensitive.

In a conventional cloud gaming pipeline, frames output from a renderer are passed to an encoder such that the renderer and encoder operate as two independent components. In accordance with the methods, apparatus, systems, and articles of manufacture disclosed herein, VRS information is shared as metadata between a renderer and an encoder. The encoder uses the VRS information contained in the metadata to achieve improved coding efficiency and a reduction in processing power. The improved efficiency and power savings are achieved because, as disclosed further herein, only areas of a video frame having rich details require a high shading rate. As a result, more bits are spent on the detail-rich areas and fewer bits are spent other areas. In some examples, the information supplied to the encoder causes the encoder to chose a quantization parameter (QP) that better fits the image being encoded. The quantization parameter (QP) relates to an amount of compression occurring for every macroblock (MB) in a frame. Large QP values indicate that a corresponding image is encoded with coarser quantization, more compression, and lower quality. In contrast, an image encoded using a low QP value indicates the opposite. Moreover, the methods, apparatus, systems and articles of manufacture disclosed herein are not sensitive to training data because training data is not used.

VRS, also known as Coarse Pixel Shading, is a novel architecture for flexible control of shading rates in a 3D graphics pipeline that. substantially reduces shading costs for various applications. VRS allows for the allocation of rendering performance/power at rates that vary across a rendered image (e.g., a greater amount of power is allocated to rendering regions of interest and a lesser amount of power is allocated to rendering other regions).

FIG. 1 shows an example cloud gaming system 100 having a set of cloud-based (e.g., remote) gaming servers 102 run video games and stream the video games to multiple different client devices/gaming devices 104A-104E. An example detector that detects regions of interest based on VRS masks of video images can be employed in the, for example, the cloud-based gaming servers 102, as described further hereinbelow.

Figure 2:
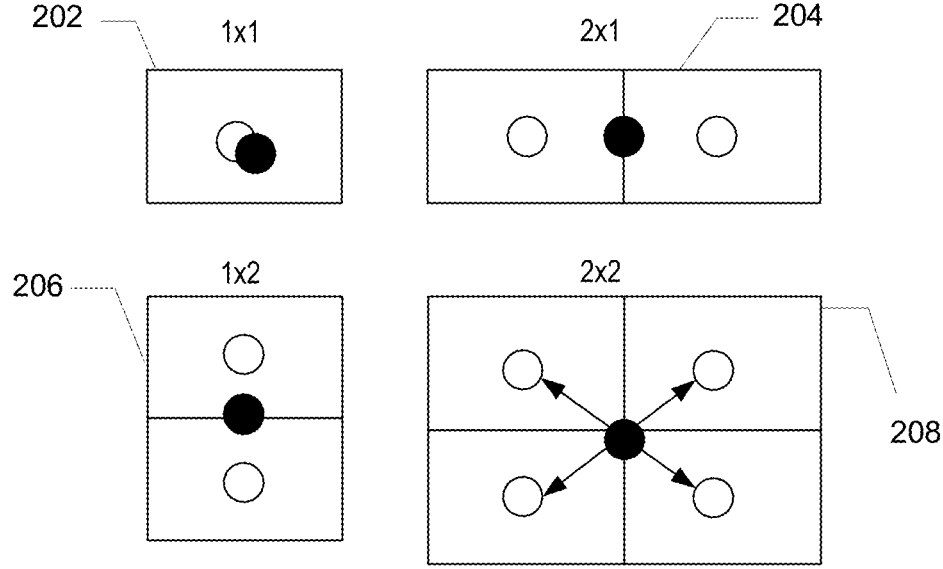
FIG. 2 is a block diagram of configurations for performing variable rate shading (VRS).

FIG. 2 shows four different configurations in which a shading rate can be determined, including a first "lxi" configuration 202, a second "2×1" configuration 204, a third "1×2" configuration 206, and a fourth "2×2" configuration 208. In the example first, second, third and fourth configurations of FIG. 2, each square represents a pixel and each black dot denotes where a coarse pixel shader of a VRS system performs a pixel shader evaluation. The results of the evaluation (represented by the black dots of FIG. 2) are subsequently broadcast to the white dots in the render target. The use of a coarse pixel shader assumes that all white dots/positions will be given/assigned the results of the evaluations performed at the position of the corresponding black dot. In general, when using VRS, more time is spent shading the pixels that matter most (e.g., that are richer in detail) and the shading rate applied to less important pixels is reduced. In addition, more of the coverage and depth information per pixel of the render target is kept relative to other software-based techniques.

In some examples, different shading densities are used to represent different shading intensities (e.g., the results of the evaluations) that are to be applied when shading a corresponding pixel (or other-sized area). Each of the different shading densities indicate a different level of intensity of the detail associated with the objects that are represented by the pixels. In some examples, a highest density of shading stands for a high level of shading intensity, and a less dense shading stands for a lower level of shading intensity.

Figure 3:
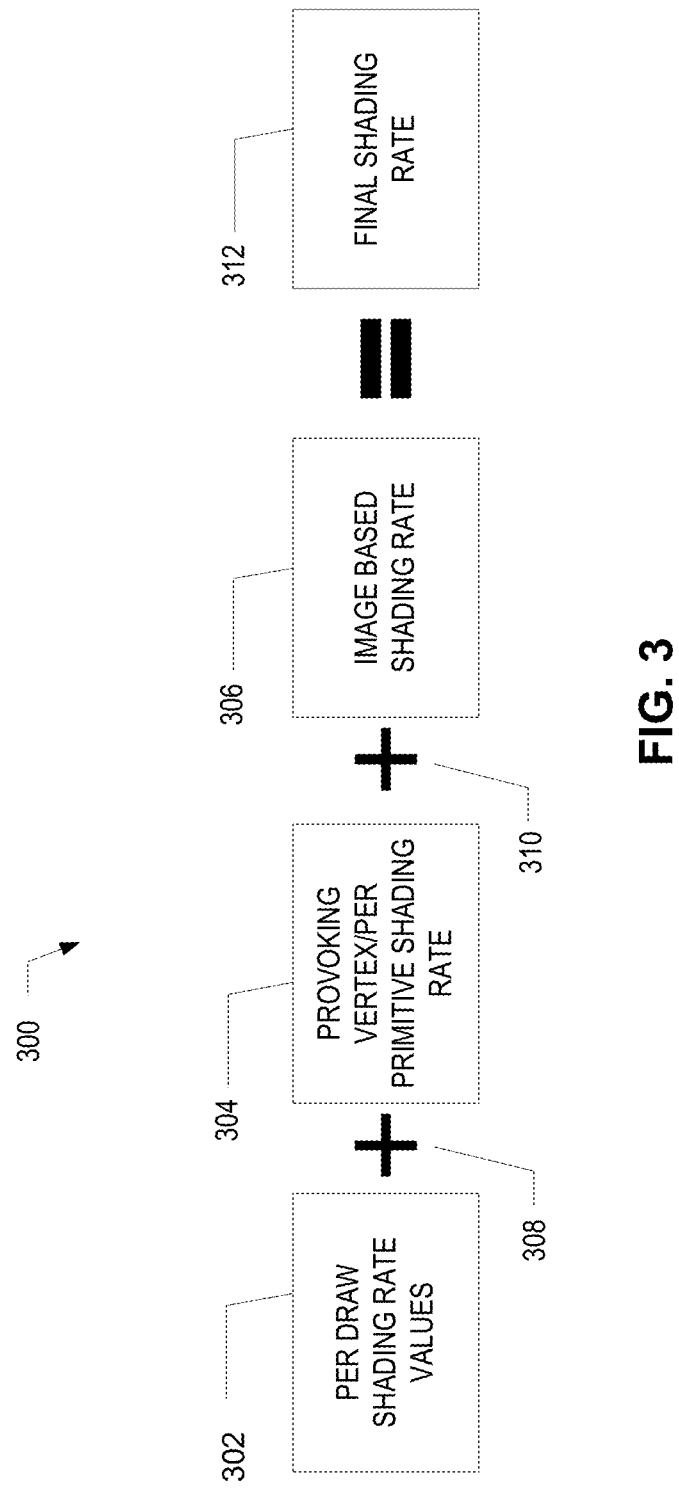
FIG. 3 is a flow diagram representative of how different rates of shading based on different shading layers are combined to create a final shading rate.

FIG. 3 illustrates an example flow 300 by which different types of shading rates are combined to form a final shading rate that is applied to the pixels. In some such examples there are 3 layers of shading rate settings. An example first layer 302 is to set a per-draw, frame-based shading rate. When using the first layer 302, a same shading rate is applied to a whole frame. An example second layer 304 is a per-provoking-vertex shading rate (or a per-primitive shading rate). To elaborate further, in a render pipeline, a VRS system can includes different types of shaders including a vertex shader and a geometry shader. In terms of pixel configurations, a "primitive" consists of multiple vertices, and one of the vertices is designated the "provoking vertex". A per-provoking-vertex shading rate and per-primitive shading rate are basically the same in that the resulting shading rate varies for each provoking vertex/primitive. The provoking vertex shading rate is from a vertex shader, and the primitive shading rate is from a geometry shader. An example third layer 306 is an image based shading rate. Imaged-based shading rate allows for the creation of a "level-of-detail (LOD) mask" image that indicates regions of varying quality, (e.g., areas that will be covered by motion blur, areas covered by depth-of-field blur, areas containing transparent objects, or areas affected by elements of a heads up display user interface).

Some VRS tools support only the per-draw layer (e.g., the first layer) while others support all three layers. As illustrated in the flow 300 of FIG. 3, a first combiner 308 and a second combiner 310 allow for the combination of the three layers of shading rate (e.g., the per-draw shading rate, the provoking vertex shading rate and the image based shading rate) to arrive at a final shading rate 312. The final shading rate for each pixel are identified on a VRS mask generated for a corresponding image.

Figure 4:
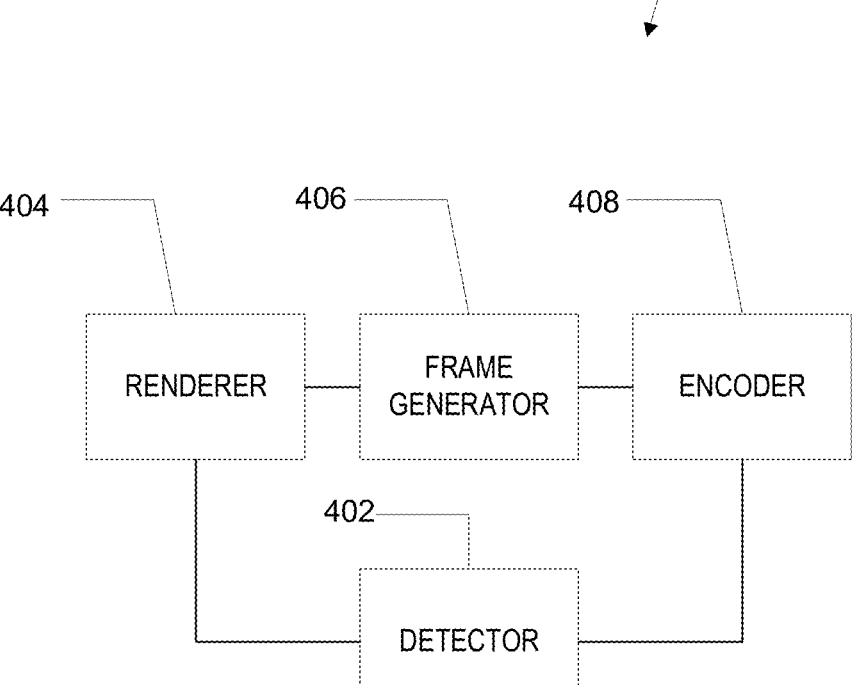
FIG. 4 is a block diagram of an example pipeline for encoding video images that includes a detector that detects regions of interest in video images based on a VRS mask generated by a renderer, in accordance with the teachings disclosed herein.

FIG. 4 is a block diagram of an example video pipeline 400 having an example detector 402 to detect regions of interest in a video image based on a VRS mask generated by an example renderer 404 in accordance with the teachings of this disclosure. In some examples, the video pipeline 400 additionally includes an example frame generator 406, and an example encoder 408. In some such examples, the example renderer 404 supplies rendered video to the frame generator 406 and supplies the VRS mask to the detector 402. The renderer 404 uses a VRS technique to render a video image and also uses the VRS technique to generate the VRS mask for usage by the detector 402. The frame generator uses the rendered image to generate a video frame which is then passed to the encoder 408. The detector 402 uses the VRS mask generated by the renderer 404 to determine regions of interest which are then supplied to the encoder 408. Thus, the VRS technique performed by the renderer servers two purposes (e.g., to produce a rendering of a video image and to enable the identification of regions of interest by the detector 402). The encoder 408 uses the regions of interest information to identify the portions of the video frame to be encoded with a greater number of bits to thereby preserve the level of detail included in those regions. In some examples, the encoder uses the regions of interest (ROIs) information to adjust the QP value used for encoding each MB in a ROI. Thus, the encoder operates more quickly and efficiently by using QP values that are appropriate to the content being encoded (e.g., whether a region of interest is being encoded or not).

Figure 5:
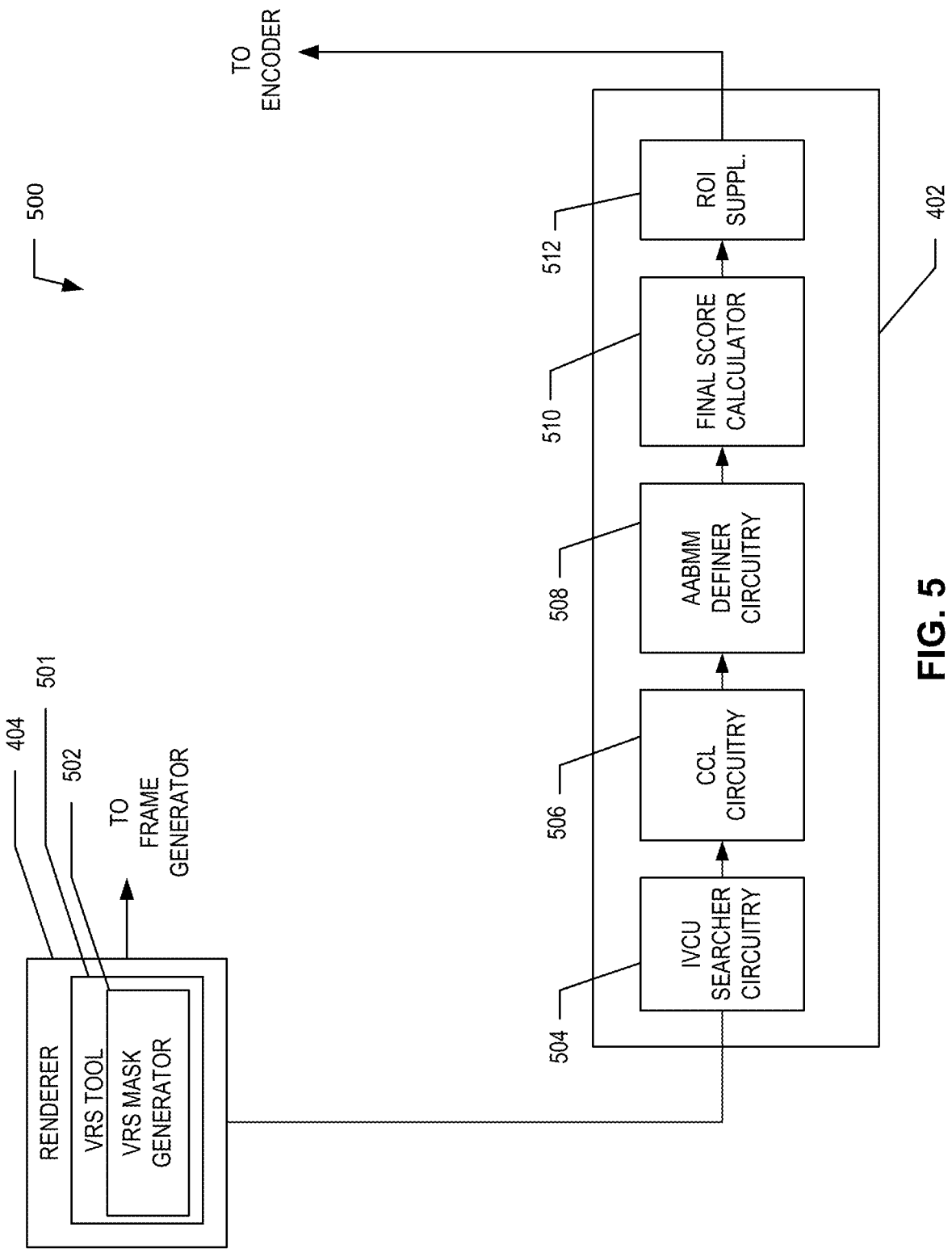
FIG. 5 is a block diagram 500 of an example implementation of the detector and the renderer of FIG. 4.

FIG. 5 is an example block diagram 500 that includes the example detector 402 of FIG. 4 and the example renderer 404 of FIG. 4. The renderer 404 includes an example VRS mask generator 502, and the detector 402 includes an example Important VRS Coding Unit (IVCU) searcher 504, an example connected component labeler (CCL) 506, an example Axis-Aligned Minimum Bounding Box (AAMBB) definer 508, an example final score calculator 510 and an example region of interest (ROI) supplier 512.

As described above, the renderer 405 (also referred to as renderer circuitry 405) includes a VRS mask generator 502 (also referred to as VRS mask generator circuitry 502) which renders a video image for supply to the example frame generator 406 (FIG. 4). In addition, the renderer 405 supplies a VRS mask generated by the VRS mask generator 502 to the IVCU searcher 504 (also referred to as the IVCU searcher circuitry 504 and/or a searcher circuitry 504) of the detector 402. The blocks of the detector 402 including the IVCU searcher 504, the CCL 506, the AABMM definer 508, the final score calculator 510, and the ROI supplier 512 use the VRS mask to identify regions of interest (ROIs) in the corresponding video image in accordance with the teachings disclosed herein. The CCL 506 is also referred to as labeling circuitry 506, the AABMM definer 508 is also referred to as bounding circuitry, the final score calculator 510 is also referred to as score calculating circuitry 510, and the As described, FIG. 5 is a block diagram of a detector (e.g., the detector 402) to detect regions of interest in a video image based on a VRS generated mask generated by the example renderer 404. Either or both of the renderer 404 and the detector 402 may be instantiated (e.g., creating an instance of, bring into being for any length of time, materialize, implement, etc.) by processor circuitry such as a central processing unit executing instructions. Additionally or alternatively, the renderer 404 and/or the detector 402 of FIG. 5 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 5 may, thus, be instantiated at the same or different times. Some or all of the circuitry may be instantiated, for example, in one or more threads executing concurrently on hardware and/or in series on hardware. Moreover, in some examples, some or all of the circuitry of FIG. 5 may be implemented by microprocessor circuitry executing instructions to implement one or more virtual machines and/or containers.

Figure 9:
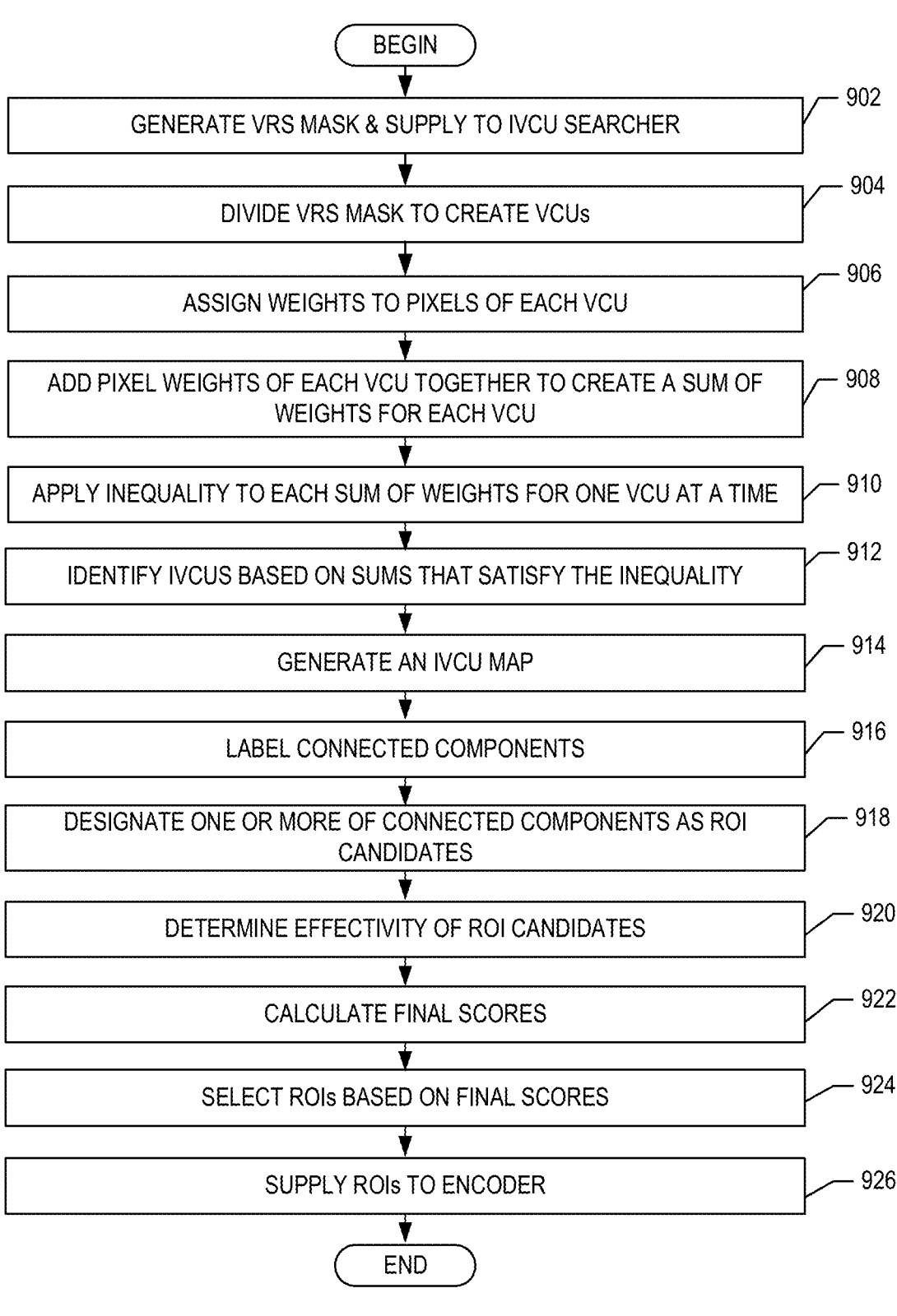
FIG. 9 is a flowchart representative of example machine readable instructions and/or example operations that may be executed by example processor circuitry to implement the detector of FIG. 5.

In some examples, the example VRS mask generator 502 is instantiated by processor circuitry executing VRS mask generator instructions and/or configured to perform operations such as those represented by the flowchart 900 of FIG. 9. In some examples, the example Important VRS Coding Unit (IVCU) searcher circuitry is instantiated by processor circuitry executing IVCU searcher instructions and/or configured to perform operations such as those represented by the flowchart 900 of FIG. 9. In some examples, the example connected component labeler CCL 506 is instantiated by processor circuitry executing connected component labeler instructions and/or configured to perform operations such as those represented by the flowchart 900 of FIG. 9.

In some examples, the example Axis-Aligned Minimum Bounding Box (AAMBB) definer 508 is instantiated by processor circuitry executing AAMBB identifier instructions and/or configured to perform operations such as those represented by the flowchart 900 of FIG. 9. In some examples, the example final score calculator 510 is instantiated by processor circuitry executing final score calculating instructions and/or configured to perform operations such as those represented by the flowchart 900 of FIG. 9. In some examples, the example region of interest (ROI) supplier 512 is instantiated by processor circuitry executing region of interest supplying instructions and/or configured to perform operations such as those represented by the flowchart 900 of FIG. 9.

Figure 6:
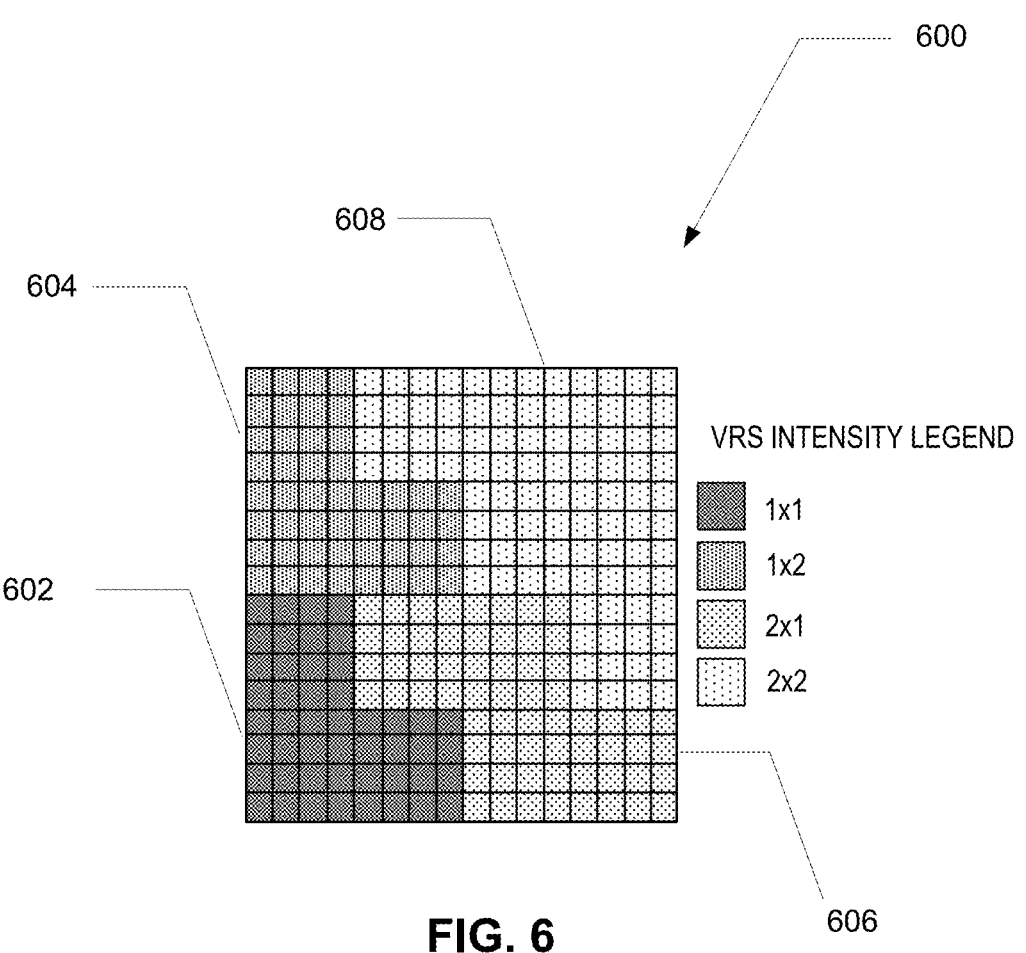
FIG. 6 is a diagram of a VRS mask generated for a video image.

In some examples, the example IVCU searcher 504 operates on a Micro Block grid of data having a size of 16×16, (e.g., the smallest coding unit often used in video encoding standards). The IVCU searcher 504 receives a VRS mask from the example VRS mask generator 502 of the example renderer 404. The IVCU searcher 504, upon receiving the VRS mask, divides the VRS mask into multiple 16×16 blocks. Each 16×16 block is referred to as a VRS Coding Unit (VCU) and, by virtue of its size, aligns with the Micro Block grid. For further illustration, an example VCU 600 is illustrated in FIG. 6 and described here with reference also to FIG. 5. As supplied by the VRS mask generator 502, the pixels represented in each VCU (e.g., the VCU 600 of FIG. 6) have been assigned different shading rates, represented by the different patterns. As illustrated in FIG. 6, an example first area 602, an example second area 604, an example third area 606, and an example fourth area 608 of the example VCU 600 include shading densities that range from most dense (first area 602) to least dense (second area 608). In such examples, the density of the shading in the pixels of FIG. 6 indicate the intensity of the shading rate. The IVCU searcher 504 applies a weight to each of the pixels included in the VCU based on the intensity of the corresponding shading rate. TABLE 1 below show example weights assigned to the first area 602, the second area 604, the third area 606, and the fourth area 608 of the VCU 600 based on the corresponding shading rates, where (a>b>c).

TABLE 1

| Shading Rate | 1 × 1 | 1 × 2 | 2 × 1 | 2 × 2 |
|---|---|---|---|---|
| Weight | a | b | b | c |

Referring again to FIG. 5, the example IVCU searcher 504 adds together the weights of each pixel within a VCU (e.g., the example VCU 600 of FIG. 6). The summed weight "w" is then compared according to an example inequality statement represented as EQN. 1 (shown below).

$$w \geq 256c + \lambda * 256(a - c)(0 \leq \lambda \leq 1) \qquad \text{EQN. 1}$$

If, the value of "w" causes the inequality of example EQN. 1 to be satisfied (where "w" stands for the sum of the weights, and λ is a coefficient), the example VCU 600 (see FIG. 6) that is currently being processed will be marked as an Important VRS Coding Unit (IVCU). As illustrated by EQN. 1, the maximum value of "w" is 256a and the minimum value of "w" is 256c (a>b>c), so the range of "w" can be described as 256*[c+λ(a–c)], where 0<λ<1. If λ=0, EQN. 1 turns into w>=256c, which results in all the VCUs being considered as IVCUs. If λ=1, EQN. 1 turns into w>=256a, which results in only those VCUs consisting of only 1×1 shading rate pixels as being considered IVCUs. In this manner, λ is used as the threshold coefficient to identify whether a VCU is an IVCU.

Figure 7:
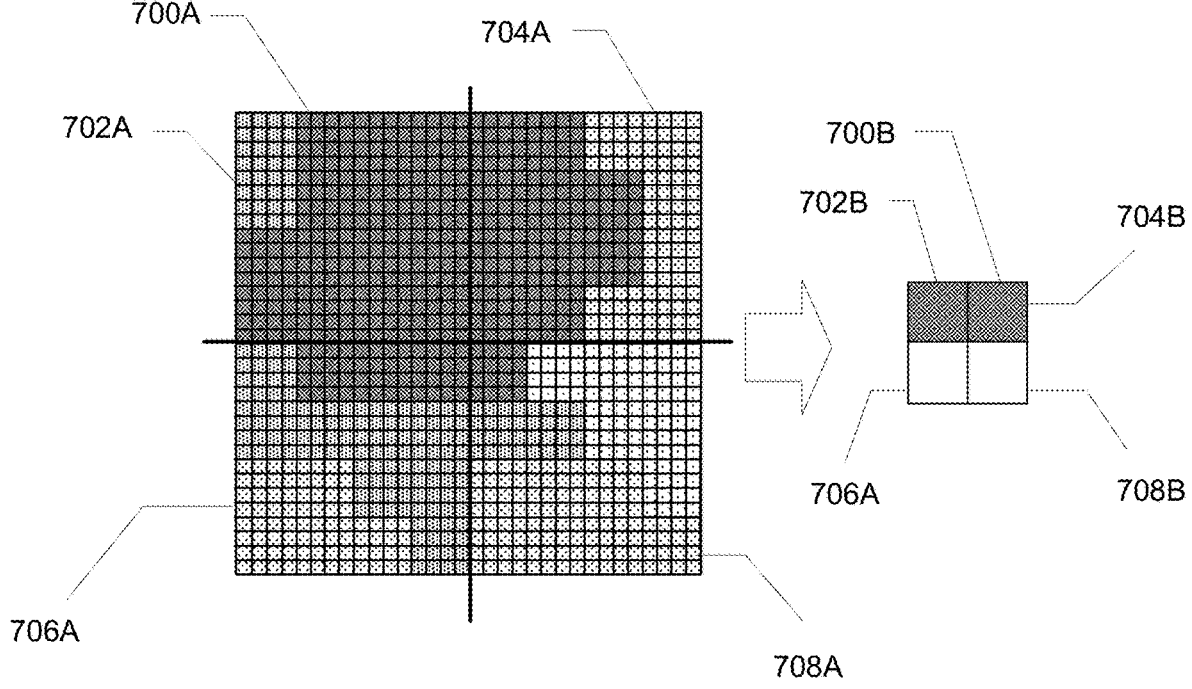
FIG. 7 is a diagram of VRS coding units (VCUs) converted to an important VRS coding unit (IVCU) map.

Referring also to FIG. 7, FIG. 7 is an example VRS mask 700A that includes four different portions of the VRS mask, each portion forms/represents one of the VCUs. As described above, the original VRS mask supplied by the example renderer 404 (see FIG. 4 and FIG. 5) was divided into VCUs of size 16×16. Assuming the VRS mask supplied to the IVCU searcher is 32×32, the VRS, when divided into VCU's results in four VCUs (of size 16×16) (e.g., a first VCU 702A, a second VCU 704A, a third VCU 706A, and a fourth VCU 708A).

After identifying the IVCU's, the example IVCU searcher 504 downscales the original VRS 700A to 1/16<sup>th</sup> of its original size resulting in an IVCU map 700B of FIG. 7. As the first and second VCUs 702A and 704A of the VRS mask will have a relatively higher summed weight (as illustrated by the greater number of pixels having more densely shaded pixels), the first VCU 702B and the second VCU 704B of the IVCU map 700B are marked with dense shading to indicate that both VCUs qualify as IVCU's. In contrast, the third and fourth VCUs 706A and 708A of the VRS mask 700A will have relatively lower summed weights (e.g., as illustrated by the scarcity of pixels that are densely shaded). Thus, the third VCU 706B and the second VCU 708B of the IVCU map 700B are marked as unshaded and white to indicate that both the third and fourth VCUs 706B and 708B do not qualify as IVCUs. Note that the shading densities used to distinguish a VCU from an IVCU are merely examples and any other types of shading, marks, colors and/or any other indicator can be used instead.

Figure 8:
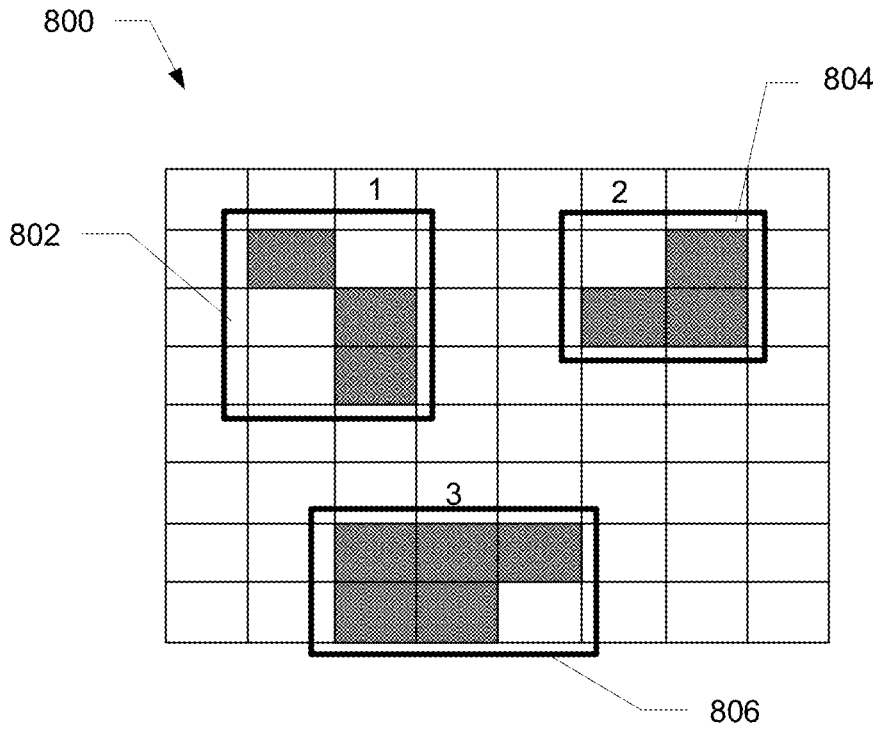
FIG. 8 is a diagram of connected components around which axis-aligned minimum boundary boxes have been drawn.

Referring still to FIG. 5, the example CCL 506 operates on IVCU maps (see IVCU map 700B of FIG. 7) generated by the example IVCU searcher 504 to label connected components. The connected components are defined to include the portions of the IVCU maps that are black and are connected (or touching). Referring also to FIG. 8, an example grid 800 illustrates an example output of the IVCU searcher (e.g., a set of IVCU maps arranged together in which some of the regions of the IVCU maps are black and others are white).

In some examples, one or more of the connected components (e.g., the black squares) are sorted by size, and small connected regions may be filtered out. In some examples a "top 32" can be used to filter out the small connected components. The connected components are labeled as such by the example connected component labeler 506 and supplied (or otherwise made available) to the example AAMBB definer 508 (FIG. 5). The AAMBB definer 508 designates one or more of the connected components to be region of interest (ROI) candidates. In general, connected components having a larger pixel size are of greater interest. By way of example, and with reference to FIG. 8, three connected components 802, 804, 806 have been labeled as ROI candidates to the AAMBB definer 508. The AAMBB definer 508 creates a boundary around each of the three connected components. In some examples, the boundary around each set of connected components 802, 804, 806 is designed as an axis-aligned minimum bounding box. Defining an AAMBB for a connected regions is performed using the coordinates of each pixel within a specific connected region (e.g., within a specific region having connected components). The pixels coordinates are reviewed to identify a value for each of Xmin, Xmax, Ymin, Ymax. The coordinates for the four vertices of the AAMBB are then determined to be (Xmin, Ymin), (Xmax, Ymin), (Xmin, Ymax), (Xmax, Ymax).

Referring still to FIG. 5, the example final score calculator 510 determines which of the AAMBBs 802, 804, 806 (of FIG. 8) (or any other number of AAMBBs) is most effective. For example, with respect to FIG. 8, the first candidate ROI1 (e.g., the first set of connected components 802), and the second candidate ROI2 (e.g., the second set of connected components 804) both contain three IVCUs. However, the second candidate ROI2 (e.g., the second set of connected components) is more "effective" than the first candidate ROI1 (the first set of connected components 802) because the second candidate ROI2 has a smaller AAMBB size, and is, therefore, selected instead of candidate ROI1.

In some examples, an equation (see EQN. 2 below) is used to measure the effectivity (represented by the coefficient β) of each of the ROI candidates (wherein "q" refers to the size of an AAMBB, and "p" refers to the number of IVCUs contained in that same AAMBB).

$$\beta = \sqrt{\frac{p}{q}} \qquad \text{EQN. 2}$$

The example final score calculator 510 then determines a final score for each ROI candidate using EQN. 3.

$$s = \beta * p \qquad \text{EQN. 3}$$

In some examples, the example final score calculator 510 identifies the sixteen (or any other number of) AAMBB's having the highest score, "s", as the ROI candidates to be provided to the ROI supplier 512 for subsequent use by the encoder. The example encoder 408 uses the ROIs to adjust a QP distribution to obtain better image quality at those regions of interest. The encoded information (e.g., the encoded image(s)) is/are supplied to a transmitter for reception at a client device/gaming device 104A-104E (FIG. 1).

In some examples, the detector 402 (see FIG. 4 and FIG. 5) includes means for generating a VRS mask. For example, the means for generating the VRS masks may be implemented by the example VRS mask generator 502. In some examples, the VRS mask generator 502 may be instantiated by processor circuitry such as the example processor circuitry 1012 of FIG. 10. For instance, the VRS mask generator 502 may be instantiated by the example microprocessor 1100 of FIG. 11 executing machine executable instructions such as those implemented by at least block 902 of FIG. 9. In some examples, the VRS mask generator 502 may be instantiated by hardware logic circuitry, which may be implemented by an ASIC, XPU, or the FPGA circuitry 1200 of FIG. 12 structured to perform operations corresponding to the machine readable instructions. Additionally or alternatively, the VRS mask generator 502 may be instantiated by any other combination of hardware, software, and/or firmware. For example, the VRS mask generator 502 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the detector 402 (see FIG. 4 and FIG. 5) includes means for searching for important VRS Coding Units. For example, the means for searching for important VRS Coding Units may be implemented by the example IVCU searcher 504. In some examples, the IVCU searcher 504 may be instantiated by processor circuitry such as the example processor circuitry 1012 of FIG. 10. For instance, the IVCU searcher 504 may be instantiated by the example microprocessor 1100 of FIG. 11 executing machine executable instructions such as those implemented by at least blocks 904, 906, 908, 910, and 912 of FIG. 9. In some examples, the IVCU searcher 504 may be instantiated by hardware logic circuitry, which may be implemented by an ASIC, XPU, or the FPGA circuitry 1200 of FIG. 12 structured to perform operations corresponding to the machine readable instructions. Additionally or alternatively, the IVCU searcher 504 may be instantiated by any other combination of hardware, software, and/or firmware. For example, the IVCU searcher 504 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the detector 402 (see FIG. 4 and FIG. 5) includes means for labeling connected components. For example, the means for labeling connected components may be implemented by the example CCL 506. In some examples, the CCL 506 may be instantiated by processor circuitry such as the example processor circuitry 1012 of FIG. 10. For instance, the CCL 506 may be instantiated by the example microprocessor 1100 of FIG. 11 executing machine executable instructions such as those implemented by at least block 914. In some examples, the CCL 506 may be instantiated by hardware logic circuitry, which may be implemented by an ASIC, XPU, or the FPGA circuitry 1200 of FIG. 12 structured to perform operations corresponding to the machine readable instructions. Additionally or alternatively, the CCL 506 may be instantiated by any other combination of hardware, software, and/or firmware. For example, the CCL 506 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the detector 402 (see FIG. 4 and FIG. 5) includes means for defining AAMBBs. For example, the means for defining AAMBBs may be implemented by the example AAMBB definer 508. In some examples, the AAMBB definer 508 may be instantiated by processor circuitry such as the example processor circuitry 1012 of FIG. 10. For instance, the AAMBB definer 508 may be instantiated by the example microprocessor 1100 of FIG. 11 executing machine executable instructions such as those implemented by at least blocks 916 and 918. In some examples, the AAMBB definer 508 may be instantiated by hardware logic circuitry, which may be implemented by an ASIC, XPU, or the FPGA circuitry 1200 of FIG. 12 structured to perform operations corresponding to the machine readable instructions. Additionally or alternatively, the AAMBB definer 508 may be instantiated by any other combination of hardware, software, and/or firmware. For example, the AAMBB definer 508 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the detector 402 (see FIG. 4 and FIG. 5) includes means for calculating a final score. For example, the means for calculating a final score may be implemented by the example final score calculator 510. In some examples, the final score calculator 510 may be instantiated by processor circuitry such as the example processor circuitry 1012 of FIG. 10. For instance, the final score calculator 510 may be instantiated by the example microprocessor 1100 of FIG. 11 executing machine executable instructions such as those implemented by at least blocks 920 and 922. In some examples, the final score calculator 510 may be instantiated by hardware logic circuitry, which may be implemented by an ASIC, XPU, or the FPGA circuitry 1200 of FIG. 12 structured to perform operations corresponding to the machine readable instructions. Additionally or alternatively, the final score calculator 510 may be instantiated by any other combination of hardware, software, and/or firmware. For example, the final score calculator 510 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the detector 402 (see FIG. 4 and FIG. 5) includes means for supplying ROIs to an encoder. For example, the means for supplying the ROIs to an encoder may be implemented by the example ROI supplier 512. In some examples, the ROI supplier 512 may be instantiated by processor circuitry such as the example processor circuitry 1012 of FIG. 10. For instance, the ROI supplier 512 may be instantiated by the example microprocessor 1100 of FIG. 11 executing machine executable instructions such as those implemented by at least block 924. In some examples, the ROI supplier 512 may be instantiated by hardware logic circuitry, which may be implemented by an ASIC, XPU, or the FPGA circuitry 1200 of FIG. 12 structured to perform operations corresponding to the machine readable instructions. Additionally or alternatively, the ROI supplier 512 may be instantiated by any other combination of hardware, software, and/or firmware. For example, the ROI supplier 512 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the detector 402 of FIG. 4 is illustrated in FIG. 5, one or more of the elements, processes, and/or devices illustrated in FIG. 5 may be combined, divided, re-arranged, omitted, eliminated, and/or implemented in any other way. Further, the example VRS mask generator 502, the example Important VRS Coding Unit (IVCU) searcher 504, the example connected component labeler 506, the example Axis-Aligned Minimum Bounding Box (AAMBB) definer 508, the example final score calculator 510, and the example region of interest supplier 512 and/or, more generally, the example detector 402 of FIG. 5, may be implemented by hardware alone or by hardware in combination with software and/or firmware. Thus, for example, any of the example VRS mask generator 502, the example Important VRS Coding Unit (IVCU) searcher 504, the example connected component labeler 506, the example Axis-Aligned Minimum Bounding Box (AAMBB) definer 508, the example final score calculator 510, and the example region of interest supplier 512, and/or, more generally, the example detector of FIG. 5, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example detector 402 of FIG. 5 may include one or more elements, processes, and/or devices in addition to, or instead of, those illustrated in FIG. 5, and/or may include more than one of any or all of the illustrated elements, processes and devices.

A flowchart representative of example machine readable instructions, which may be executed to configure processor circuitry to implement the detector 402 of FIG. 5, is shown in FIG. 9. The machine readable instructions may be one or more executable programs or portion(s) of an executable program for execution by processor circuitry, such as the processor circuitry 1012 shown in the example processor platform 1000 discussed below in connection with FIG. 10 and/or the example processor circuitry discussed below in connection with FIGS. 11 and/or 12. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 9, many other methods of implementing the example detector X may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 9 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 9 is a flowchart representative of example machine readable instructions and/or example operations 900 that may be executed and/or instantiated by processor circuitry to detect regions of interest in a video image using VRS generated masks. The machine readable instructions and/or the operations 900 of FIG. 9 begin at a block 902, at which the example VRS mask generator 502 (FIG. 5) of the example renderer 404 (FIG. 4) generates a VRS mask based on a video image and supplies the VRS mask to the example IVCU searcher 504 (FIG. 5) of the example detector 402 (FIG. 4). The IVCU searcher 504 divides the VRS mask into multiple 16×16 blocks (referred to as VCUs), at a block 904. At a block 906, the IVCU searcher 504 assigns a weight to each of the pixels included in each the VCUs based on corresponding shading rates of the pixels, as described above with respect to FIG. 5. At a block 908, the IVCU searcher 504 adds together the weights of each pixel of the example VCU 600 (see FIG. 6). The IVCU searcher 504 then compares the summed weight "w" using an example inequality statement represented as EQN. 1 (shown below) (see block 910).

$$w \geq 256c + \lambda * 256(a - c)(0 \leq \lambda \leq 1) \qquad \text{EQN. 1}$$

Based on the whether the inequality is satisfied by a sum (e.g., w), the corresponding VCU is identified as an IVCU (see block 912). If the inequality expressed in EQN. 1 is not satisfied, the IVCU searcher 504 can disregard the corresponding VCU. At a block 914, the IVCUs are used to generate an IVCU map in the manner described above with reference to FIG. 5.

Referring still to FIG. 9, the example CCL 506 (FIG. 5) labels connected components included on the IVCU maps (see block 916). At a block 918, the labeled connected components are supplied (or otherwise made available) to the example AAMBB definer 508 (FIG. 5) which designates one or more of the connected components to be regions of interest (ROI) candidates, as described above with reference to FIG. 5.

At a block 920, the example final score calculator 510 determines which of the AAMBBs (see for example, FIG. 8) are most effective. In some examples, and as described above, determining effectivity (represented by the coefficient $\beta$) of each of the ROI candidates includes applying EQN. 2, as described above with reference to FIG. 5.

$$\beta = \sqrt{\frac{p}{q}} \qquad \text{EQN. 2}$$

At a block 922, the example final score calculator 510 determines a final score for each ROI candidate using EQN. 3.

$$s = \beta * p \qquad \text{EQN. 3}$$

Based on the results of the final score equation (EQN, 3), the final score calculator 510 identifies the sixteen (or any other number of the) AAMBB's having the highest score, "s", as the ROIs to be provided to the ROI supplier 512 (block 924). Subsequently, the ROI supplier 512 provides the ROIs to the encoder (see block 924). Thereafter the flowchart 900 ends. In some examples, when a next VRS map is received for a next video image, the detector 402 operates to repeat the flowchart of FIG. 9. In some examples, after the flowchart 900, the example encoder 408 encodes the ROIs before sending encoded information to a transmitter for reception at a client device/gaming device (see FIG. 1).

Figure 10:
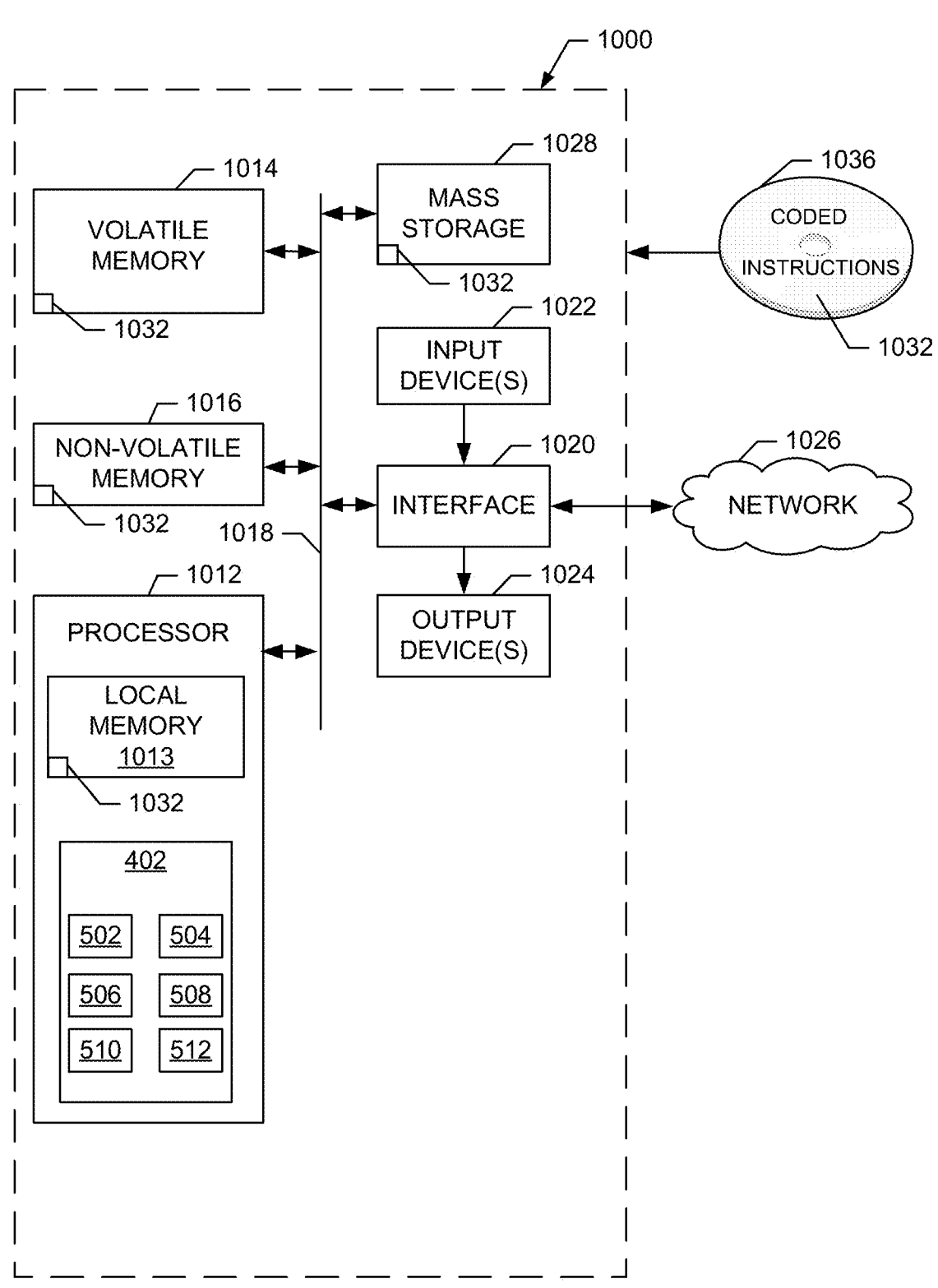
FIG. 10 is a block diagram of an example processing platform including processor circuitry structured to execute the example machine readable instructions and/or the example operations of FIG. 9 to implement the detector of FIG. 5.

FIG. 10 is a block diagram of an example processor platform 1000 structured to execute and/or instantiate the machine readable instructions and/or the operations of FIG. 9 to implement the detector 402 of FIG. 4 and FIG. 5. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs, microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example VRS mask generator 502, the example IVCU searcher 504, the example CCL 506, the example AAMBB definer 508, the example final score calculator 510 and the example regions of interest supplier 512.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1024 are also connected to the interface circuitry 1020 of the illustrated example. The output device(s) 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 1032, which may be implemented by the machine readable instructions of FIG. 9, may be stored in the mass storage device 1028, in the volatile memory 1014, in the non-volatile memory 1016, and/or on a removable non-transitory computer readable storage medium such as a CD or DVD.

Figure 11:
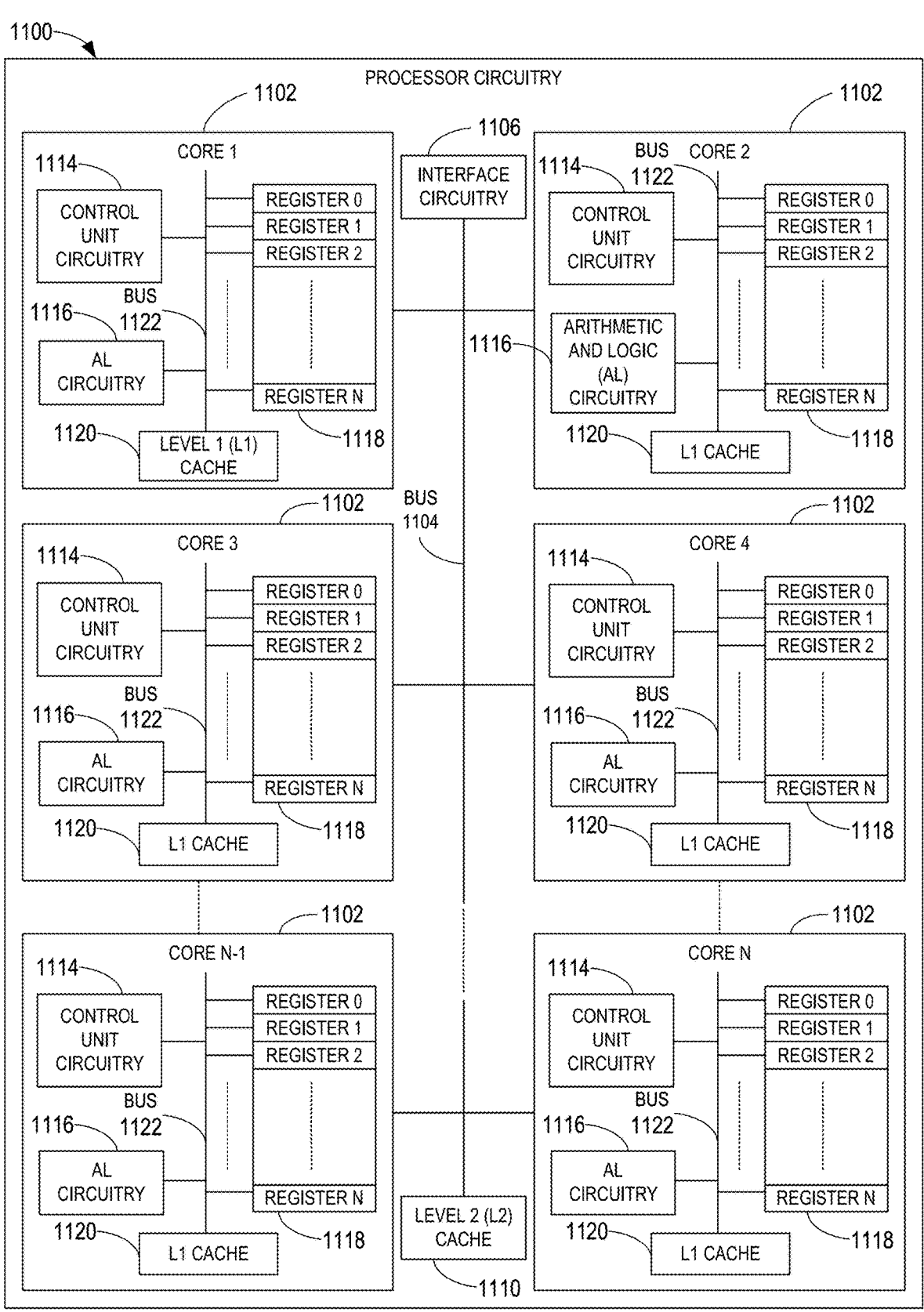
FIG. 11 is a block diagram of an example implementation of the processor circuitry of FIG. 10.

FIG. 11 is a block diagram of an example implementation of the processor circuitry 1012 of FIG. 10. In this example, the processor circuitry 1012 of FIG. 10 is implemented by a microprocessor 1100. For example, the microprocessor 1100 may be a general purpose microprocessor (e.g., general purpose microprocessor circuitry). The microprocessor 1100 executes some or all of the machine readable instructions of the flowchart of FIG. 9 to effectively instantiate the circuitry of FIG. 5 as logic circuits to perform the operations corresponding to those machine readable instructions. In some such examples, the circuitry of FIG. 5 is instantiated by the hardware circuits of the microprocessor 1100 in combination with the instructions. For example, the microprocessor 1100 may be implemented by multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all of the machine readable instructions and/or operations represented by the flowchart of FIG. 9.

The cores 1102 may communicate by a first example bus 1104. In some examples, the first bus 1104 may be implemented by a communication bus to effectuate communication associated with one(s) of the cores 1102. For example, the first bus 1104 may be implemented by at least one of an Inter-Integrated Circuit (I2C) bus, a Serial Peripheral Interface (SPI) bus, a PCI bus, or a PCIe bus. Additionally or alternatively, the first bus 1104 may be implemented by any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2 cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 10). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the local memory 1120, and a second example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer based operations. In other examples, the AL circuitry 1116 also performs floating point operations. In yet other examples, the AL circuitry 1116 may include first AL circuitry that performs integer based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 11. Alternatively, the registers 1118 may be organized in any other arrangement, format, or structure including distributed throughout the core 1102 to shorten access time. The second bus 1122 may be implemented by at least one of an I2C bus, a SPI bus, a PCI bus, or a PCIe bus Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 12:
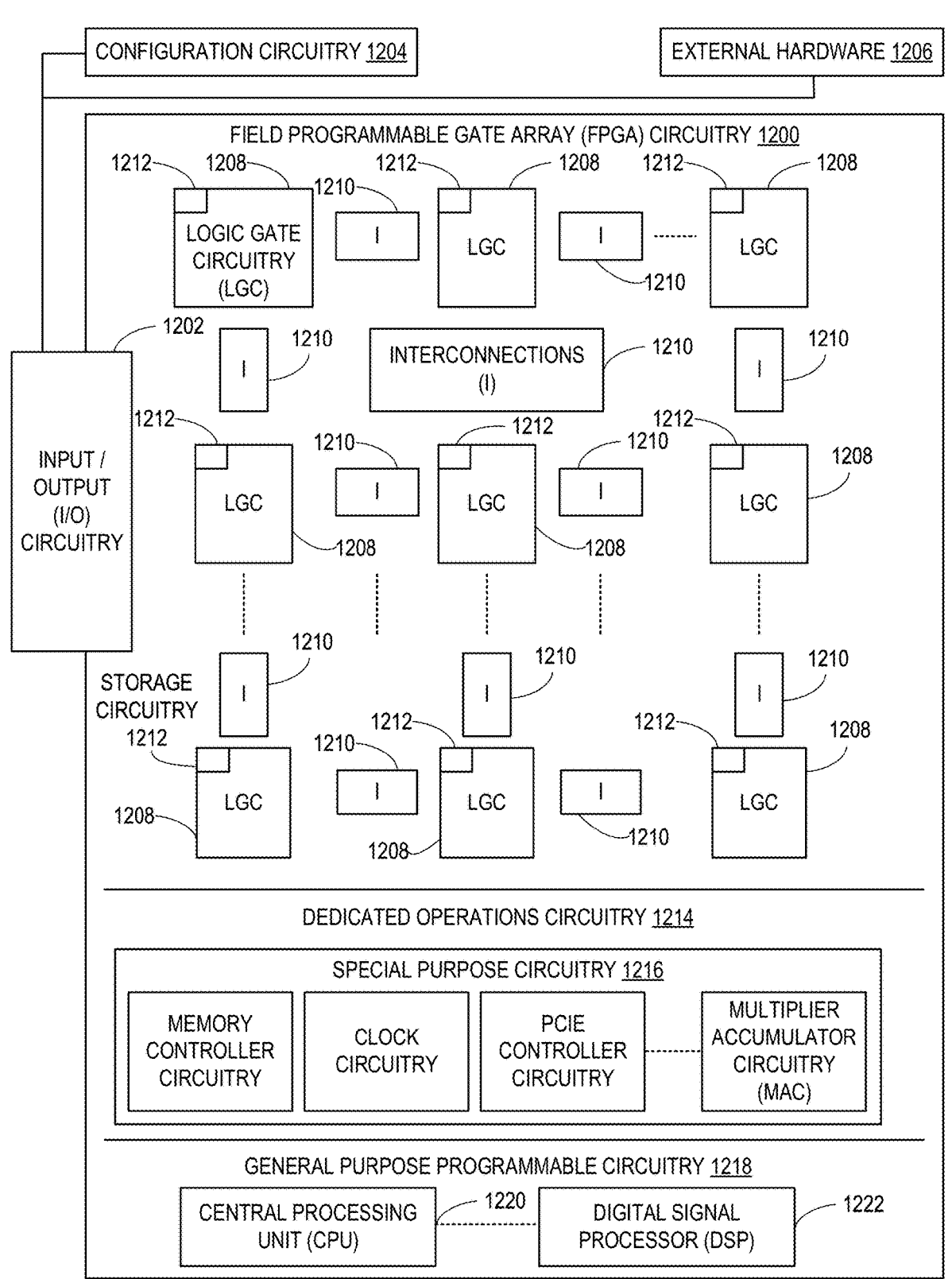
FIG. 12 is a block diagram of another example implementation of the processor circuitry of FIG. 10.

FIG. 12 is a block diagram of another example implementation of the processor circuitry 1012 of FIG. 10. In this example, the processor circuitry 1012 is implemented by FPGA circuitry 1200. For example, the FPGA circuitry 1200 may be implemented by an FPGA. The FPGA circuitry 1200 can be used, for example, to perform operations that could otherwise be performed by the example microprocessor 1100 of FIG. 11 executing corresponding machine readable instructions. However, once configured, the FPGA circuitry 1200 instantiates the machine readable instructions in hardware and, thus, can often execute the operations faster than they could be performed by a general purpose microprocessor executing the corresponding software.

More specifically, in contrast to the microprocessor 1100 of FIG. 11 described above (which is a general purpose device that may be programmed to execute some or all of the machine readable instructions represented by the flowchart of FIG. 9 but whose interconnections and logic circuitry are fixed once fabricated), the FPGA circuitry 1200 of the example of FIG. 12 includes interconnections and logic circuitry that may be configured and/or interconnected in different ways after fabrication to instantiate, for example, some or all of the machine readable instructions represented by the flowchart of FIG. 9. In particular, the FPGA circuitry 1200 may be thought of as an array of logic gates, interconnections, and switches. The switches can be programmed to change how the logic gates are interconnected by the interconnections, effectively forming one or more dedicated logic circuits (unless and until the FPGA circuitry 1200 is reprogrammed). The configured logic circuits enable the logic gates to cooperate in different ways to perform different operations on data received by input circuitry. Those operations may correspond to some or all of the software represented by the flowchart of FIG. 9. As such, the FPGA circuitry 1200 may be structured to effectively instantiate some or all of the machine readable instructions of the flowchart of FIG. 9 as dedicated logic circuits to perform the operations corresponding to those software instructions in a dedicated manner analogous to an ASIC. Therefore, the FPGA circuitry 1200 may perform the operations corresponding to the some or all of the machine readable instructions of FIG. 9 faster than the general purpose microprocessor can execute the same.

In the example of FIG. 12, the FPGA circuitry 1200 is structured to be programmed (and/or reprogrammed one or more times) by an end user by a hardware description language (HDL) such as Verilog. The FPGA circuitry 1200 of FIG. 12, includes example input/output (I/O) circuitry 1202 to obtain and/or output data to/from example configuration circuitry 1204 and/or external hardware 1206. For example, the configuration circuitry 1204 may be implemented by interface circuitry that may obtain machine readable instructions to configure the FPGA circuitry 1200, or portion(s) thereof. In some such examples, the configuration circuitry 1204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1206 may be implemented by external hardware circuitry. For example, the external hardware 1206 may be implemented by the microprocessor 1100 of FIG. 11. The FPGA circuitry 1200 also includes an array of example logic gate circuitry 1208, a plurality of example configurable interconnections 1210, and example storage circuitry 1212. The logic gate circuitry 1208 and the configurable interconnections 1210 are configurable to instantiate one or more operations that may correspond to at least some of the machine readable instructions of FIG. 9 and/or other desired operations. The logic gate circuitry 1208 shown in FIG. 12 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1208 to enable configuration of the electrical structures and/or the logic gates to form circuits to perform desired operations. The logic gate circuitry 1208 may include other electrical structures such as look-up tables (LUTs), registers (e.g., flip-flops or latches), multiplexers, etc.

The configurable interconnections 1210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1208 to program desired logic circuits.

The storage circuitry 1212 of the illustrated example is structured to store result(s) of the one or more of the operations performed by corresponding logic gates. The storage circuitry 1212 may be implemented by registers or the like. In the illustrated example, the storage circuitry 1212 is distributed amongst the logic gate circuitry 1208 to facilitate access and increase execution speed.

The example FPGA circuitry 1200 of FIG. 12 also includes example Dedicated Operations Circuitry 1214. In this example, the Dedicated Operations Circuitry 1214 includes special purpose circuitry 1216 that may be invoked to implement commonly used functions to avoid the need to program those functions in the field. Examples of such special purpose circuitry 1216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1200 may also include example general purpose programmable circuitry 1218 such as an example CPU 1220 and/or an example DSP 1222. Other general purpose programmable circuitry 1218 may additionally or alternatively be present such as a GPU, an XPU, etc., that can be programmed to perform other operations.

Although FIGS. 11 and 12 illustrate two example implementations of the processor circuitry 1012 of FIG. 10, many other approaches are contemplated. For example, as mentioned above, modern FPGA circuitry may include an on-board CPU, such as one or more of the example CPU 1220 of FIG. 12. Therefore, the processor circuitry 1012 of FIG. 10 may additionally be implemented by combining the example microprocessor 1100 of FIG. 1 and the example FPGA circuitry 1200 of FIG. 12. In some such hybrid examples, a first portion of the machine readable instructions represented by the flowchart of FIG. 9 may be executed by one or more of the cores 1102 of FIG. 11, a second portion of the machine readable instructions represented by the flowchart of FIG. 9 may be executed by the FPGA circuitry 1200 of FIG. 12, and/or a third portion of the machine readable instructions represented by the flowchart of FIG. 9 may be executed by an ASIC. It should be understood that some or all of the circuitry of FIG. 5 may, thus, be instantiated at the same or different times. Some or all of the circuitry may be instantiated, for example, in one or more threads executing concurrently and/or in series. Moreover, in some examples, some or all of the circuitry of FIG. 5 may be implemented within one or more virtual machines and/or containers executing on the microprocessor.

In some examples, the processor circuitry 1012 of FIG. 10 may be in one or more packages. For example, the microprocessor 1100 of FIG. 11 and/or the FPGA circuitry 1200 of FIG. 12 may be in one or more packages. In some examples, an XPU may be implemented by the processor circuitry 1012 of FIG. 10, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that improve the processing of video images by reducing a number of image pixels that need to be encoded. Disclosed systems, methods, apparatus, and articles of manufacture improve the efficiency of using a computing device by lowering the amount of processing power used by the computing device and reducing the complexity and speed at which the computing device can process images for encoding. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to detect regions of interest of a video image based on a variable rate shading mask generated by a renderer are disclosed herein. Example methods, apparatus, systems, and articles of manufacture to detect regions of interest in a video image based on a variable rate shading mask generated by a renderer are disclosed herein. Further examples and combinations thereof include the following: Example 1 includes an apparatus to identify regions of interest of an image comprising interface circuitry to receive a video image, and processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate detector circuitry configured to be coupled to a renderer circuitry, to receive a variable rate shading (VRS) mask based on a video image from the renderer circuitry, and to detect regions of interest of the video image based on the VRS mask, and encoder circuitry to encode the regions of interest of the video image, the encoding circuitry to adjust a quantization parameter to encode the regions of interest, the quantization parameter based on the regions of interest.

Example 2 includes the apparatus of example 1, wherein the detector circuitry includes searcher circuitry to search the VRS mask to identify divisions of the VRS mask having a weight that satisfies a threshold.

Example 3 includes the apparatus of example 2, wherein the detector circuitry includes labeling circuitry to identify and label connected components of the VRS mask associated with the division of the VRS mask having the weight that satisfies the threshold, bounding circuitry to determine a boundary around each set of the labeled connected components resulting in a bounded component, and score calculating circuitry to determine a corresponding score for corresponding ones of the bounded components and to identify selected ones of the bounded components as regions of interest, the selected ones of the bounded components being selected based on the corresponding scores of the corresponding bounded components.

Example 4 includes the apparatus of example 2, wherein the searcher circuitry is to i) create divisions of the VRS mask, the divisions including pixels, ii) assign respective weights to respective ones of the pixels based on variable shading rates of the pixels, iii) determine respective sums of the weights of the pixels of respective ones of the divisions of the VRS mask, and iv) when any of the respective ones of the sums satisfies the threshold, identify the corresponding divisions as important divisions.

Example 5 includes an apparatus to detect regions of interest of a video image comprising at least one memory, machine readable instructions, and processor circuitry to at least one of instantiate or execute the machine readable instructions to detect the regions of interest of the video image based on a variable rate shaded (VRS) mask of the video image, the VRS mask generated by a renderer, and encode the regions of interest of the video image.

Example 6 includes the apparatus of example 5, wherein the processor circuitry to detect the regions of interest is to search the VRS mask of the video image to identify divisions of the VRS mask having a total weight that satisfies a threshold.

Example 7 includes the apparatus of example 6, wherein to search the VRS mask the processing circuitry is to partition the VRS mask into the divisions, the divisions of the VRS mask having pixels, assign weights the pixels based on corresponding variable rate shadings provided in the VRS mask, sum the weights of the pixels of each division of the VRS mask to determine a total weight for each division, and when any of the total weights satisfies the threshold, identify the divisions corresponding to the total weights to be important divisions.

Example 8 includes the apparatus of example 5, wherein to processor circuitry, to detect the regions of interest, is to determine that one or more divisions of the VRS mask include potential regions of interest, when one or more of the divisions of the VRS mask is determined to include potential regions of interest, reduce the size of the entire VRS mask to create a map, label components of the map that have an intense rate of shading and that are connected to one another, generate a boundary around each of the components that are labeled, and identify any of the components that are labeled and around which a boundary has been generated as a candidate region of interest.

Example 9 includes the apparatus of example 8, wherein the processor circuitry, to detect the regions of interest is to determine an effectivity value for each of a plurality of the components that have been labeled and bounded, select a subset of the plurality of components that are labeled and bounded based on the effectivity values, generate a score for the subset of the plurality of components that are labeled and bounded, select a number of the subset of the plurality of components that are labeled and bounded based on the scores, and supply the number of the subset of the plurality of components that are labeled and bounded as regions of interest to an encoder.

Example 10 includes the apparatus of example 5, wherein the processor circuitry, to detect the regions of interest, is to determine that a division of the VRS mask has one or more regions of interest, based on the determination that the division of the VRS mask has one or more regions of interest, reduce the size of the VRS mask, identify one or more groups of pixels included in the division of the VRS mask that are associated with an intense variable rate of shading and that touch one another, select a subset of the one or more of the groups of pixels based on an effectivity value associated with each of the groups of pixels, calculate scores for each of the one or more groups of pixels in the subset, and select, from among the subset, one or more of the regions of interest to be identified to an encoder.

Example 11 includes a non-transitory machine readable storage medium comprising instructions that, when executed, cause processor circuitry to at least detect regions of interest of a video image based on a variable rate shading (VRS) mask of the video image, the VRS mask of the video image created by a renderer using variable rate shading (VRS), and encode the regions of interest of the video image, wherein a quantization parameter is adjusted to a setting suitable to encode the regions of interest.

Example 12 includes the non-transitory machine readable storage medium of example 11 including instructions that, when executed, cause processor circuitry to search the VRS mask of the video image to identify divisions of the VRS mask having a weight that satisfies a threshold.

Example 13 includes the non-transitory machine readable storage medium of example 11 wherein to search the VRS mask, the instructions, when executed, cause processor circuitry to divide the VRS mask of the video image into the divisions, the divisions including pixels, assign respective weights to respective ones of the pixels based on variable shading rates of the respective pixels, determine, for each of the divisions, a sum of the weights of the pixels included in the divisions to obtain a total weight for each of the divisions, and when the total weight of any of the divisions satisfies a threshold, identify the corresponding divisions of the VRS mask as being important divisions.

Example 14 includes the transitory machine readable storage medium of example 13 including instructions that, when executed, cause processor circuitry to identify and label sets of connected components included in the important divisions of the VRS mask, determine a boundary around each labeled set of the connected components resulting in sets of labeled, bounded components, determine an effectivity score for a first subset of the sets of labeled, bounded components, based on the effectivity scores, form a second subset of the first subset of the labeled, bounded components, determine a final score for each of the sets of labeled, bounded components in the second subset, select one or more of the sets of labeled, bounded components in the second subset based on the final scores to form a third subset of the labeled, bounded components, and identify the third subset of the labeled, bounded components as regions of interest to an encoder.

Example 15 includes the transitory machine readable storage medium of example 11 wherein to detect the regions of interest, the instructions that, when executed, cause processor circuitry to determine that the VRS mask includes potential regions of interest, based on the determination, reduce the size of the VRS mask to create a map, label components of the map that have an intense rate of shading and that are connected to one another, generate a boundary around the labeled components, and identify the bounded, labeled components as a candidate region of interest.

Example 16 includes a method to encode regions of interest of a video image based on a variable rate shading (VRS) mask comprising detecting, with one or more processors, regions of interest of the video image based on the VRS mask, the VRS mask generated by a renderer, and encoding, with one or more processors, the regions of interest of the video image, the encoding to include adjusting a quantization parameter suitable to encoding the regions of interest.

Example 17 includes the method of example 16, wherein detecting the regions of interest includes searching the VRS mask of the video image to identify regions of the VRS mask having a weight that satisfies a threshold.

Example 18 includes the method of example 17, wherein searching the VRS mask includes dividing the VRS mask of the video image into sub-components, the subcomponents including pixels, assigning respective weights to respective ones of the pixels based on variable shading rates of the pixels identified in the VRS mask, determining a sum of the weights for each sub-component to identify a total weight, and when the total weight of any of the sub-components satisfies a threshold, identifying the VRS mask of the video image as having region of interest candidates.

Example 19 includes the method of example 16, wherein detecting the regions of interest includes labeling connected portions of the VRS mask that have been identified as having a high intensity shading rate and as touching one another, determining a boundary around each set of the labeled, connected components resulting in labeled, bounded components, determining an effectivity score for a first subset of the labeled, bounded components, based on the effectivity scores, forming a second subset of the first subset of the labeled, bounded components, determining a final score for each of the labeled, bounded components in the second subset, selecting one or more of the labeled, bounded components in the second subset based on the final scores to form a third subset of the labeled, bounded components, and identifying the third subset of the labeled, bounded components as the regions of interest.

Example 20 includes the method of example 16, wherein detecting the regions of interest includes reducing the size of the VRS mask to create a map, labeling components of the VRS map that have an intense rate of shading and that are connected to one another, generating a boundary around the labeled components, and identifying the bounded, labeled components as candidate regions of interest.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

at least one memory;

machine readable instructions; and at least one processor circuit to be programmed based on the machine readable instructions to:

partition a variable rate shaded (VRS) mask of a video image into divisions, the VRS mask generated by renderer circuitry, the divisions of the VRS mask having pixels;

assign weights to the pixels based on corresponding variable rate shadings provided in the VRS mask;

sum the weights of the pixels of respective ones of the divisions of the VRS mask to determine respective total weights for the divisions;

identify ones of the divisions of the VRS mask having total weights that satisfy a threshold as important divisions;

detect one or more regions of interest of the video image based on the important divisions of the VRS mask; and encode the one or more regions of interest of the video image.

2. The apparatus of claim 1, wherein one or more of the at least one processor circuit is to:

reduce a size of the VRS mask to create a map;

label components of the map that are connected to one another and associated with the important divisions;

generate a boundary around ones of the components that are labeled; and identify the boundary as associated with a candidate region of interest.

3. The apparatus of claim 2, wherein one or more of the at least one processor circuit is to:

determine an effectivity value associated with the boundary;

generate a score associated with the boundary based on the effectivity value; and supply the boundary as a region of interest to an encoder.

4. The apparatus of claim 1, wherein one or more of the at least one processor circuit is to:

reduce a size of the VRS mask;

identify one or more groups of pixels included in the VRS mask that are associated with important divisions and that touch one another;

select a subset of the one or more groups of pixels based on effectivity values associated respectively with the one or more groups of pixels;

calculate scores for the one or more groups of pixels in the subset; and select, from among the subset, the one or more of the regions of interest to be identified to an encoder.

5. A non-transitory machine readable storage medium comprising instructions to cause at least one processor circuit to at least:

detect that a variable rate shading (VRS) mask associated with a video image includes potential regions of interest;

reduce a size of the VRS mask to create a map;

identify a set of connected components of the map having components that are connected together and associated with weights that satisfy a threshold;

generate a boundary around the set of the connected components;

detect one or more regions of interest of the video image based on the boundary; and encode the one or more detected regions of interest of the video image.

6. The non-transitory machine readable storage medium of claim 5, wherein the weights are total weights, and the instructions are to cause one or more of the at least one processor circuit to:

divide the VRS mask of the video image into divisions, the divisions including respective pixels;

assign respective weights to ones of the pixels based on variable shading rates of the respective pixels;

determine, for each of the divisions, sums of the respective weights of the pixels included in the divisions to obtain the total weights for the divisions; and identify ones of the divisions of the VRS mask having total weights that satisfy the threshold as being the potential regions of interest.

7. The non-transitory machine readable storage medium of claim 5, wherein the instructions are to cause one or more of the at least one processor circuit to:

determine boundaries around respective sets of connected components having components that are connected together and associated with weights that satisfy the threshold;

determine respective effectivity values for the boundaries;

determine respective final scores for the boundaries based on the effectivity values; and select one or more of the boundaries based on the final scores to form the one or more detected regions of interest.

8. A method comprising:

identifying respective sets of connected components of a variable rate shading (VRS) map, the sets of connected components having components that are connected together and associated with weights that satisfy a threshold, the VRS map based on a VRS mask associated with a video image;

determining boundaries around the respective sets of the connected components;

determining respective effectivity scores for the boundaries;

determining respective final scores for the boundaries based on the effectivity scores;

selecting, based on the final scores, one or more of the boundaries to form regions of interest of the video image; and encoding, with at least one processor circuit, the regions of interest of the video image.

9. The method of claim 8, including:

dividing the VRS mask of the video image into sub-components, the sub-components including pixels;

assigning respective weights to the pixels based on variable shading rates of the pixels identified in the VRS mask;

determining sums of the respective weights associated with the sub-components to determine respective total weights for the sub-components; and based on the total weights of the sub-components, identifying the VRS mask of the video image as having region of interest candidates.

10. The method of claim 8, including reducing a size of the VRS mask to create the VRS map.

11. The apparatus of claim 1, wherein one of more of the at least one processor circuit is to:

adjust a quantization parameter based on a first region of interest of the one or more regions of interest; and encode the first region of interest of the video image based on the adjusted quantization parameter.

12. The non-transitory machine readable storage medium of claim 5, wherein the instructions are to cause one or more of the at least one processor circuit to:

adjust a quantization parameter based on a first region of interest of the one or more regions of interest; and encode the first region of interest of the video image based on the adjusted quantization parameter.

13. The method of claim 8, including:

adjusting a quantization parameter based on a first region of interest of the regions of interest; and encoding the first region of interest of the video image based on the adjusted quantization parameter.

* * * * *